No. 16,624. PATENTED FEB. 10, 1857.
S. P. WINNE.
MACHINE FOR RESAWING LUMBER.
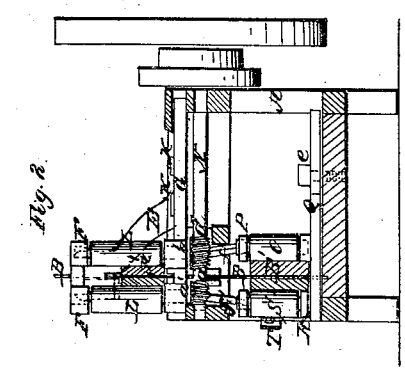
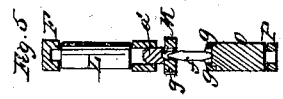
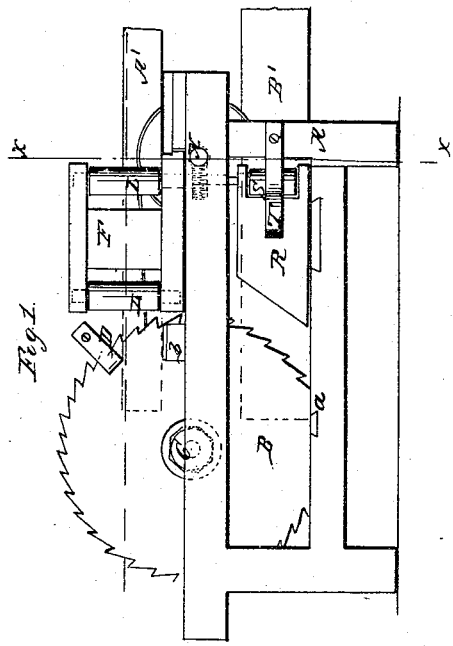
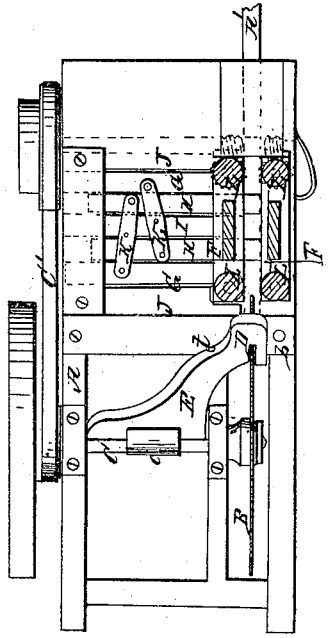

UNITED STATES PATENT OFFICE.

SIMON P. WINNE, OF ALBANY, NEW YORK.

MACHINE FOR RESAWING LUMBER.

Specification of Letters Patent No. 16,624, dated February 10, 1857.

*To all whom it may concern:*

Be it known that I, SIMON P. WINNE, of Albany, in the county of Albany and State of New York, have invented a new and Improved Sawing-Machine for Resawing Lumber; and I do hereby declare that the following is a full, clear, and exact description of the same, reference being had to the annexed drawings, making a part of this specification, in which—

Figure 1 is a side view of my improvement. Fig. 2 is a transverse vertical section of ditto (x) (x) Fig. 1 showing the plane of section. Fig. 3 is a plan or top view of ditto. Fig. 4 is a detached view of one of the pinions which connect the upper and lower feed rollers. Fig. 5 is a detached vertical section of one of the upper and one of the lower feed rollers, showing the manner in which they are connected.

Similar letters of reference indicate corresponding parts in the several figures.

My invention consists in the employment or use of feed rollers, arranged as will be hereinafter fully shown and described, whereby plank or lumber of any kind may be sawed directly through the center, and also sawed into strips or boards of different width, two different kinds of stuff being sawed at the same time by one and the same saw.

To enable those skilled in the art to fully understand and construct my invention, I will proceed to describe it.

A represents a rectangular frame which may be constructed in any proper manner to support the working parts.

B represents a circular saw, the arbor C of which is placed transversely on the frame A, and (a) (b) are guides attached permanently to the frame A, between which guides the edge of the saw B works.

D is an adjustable or movable guide fitted over the edge of the saw. This guide is attached to the end of a bar E, the lower end of which is secured by a strap (c) to the saw arbor C, the arbor being allowed to turn freely within the strap, and the strap allowed to turn freely on the arbor so that the guide D may always rest upon the upper edge or surface of the stuff whatever its width may be.

F, F, represent the vertical frames, the lower ends of which are attached permanently to horizontal slides G, G, H, H, which are placed on the upper part of the frame A and allowed to slide or work freely between a center bar I and cleats J, J, on the frame. Each frame F is attached to two slides, and the slides of each frame are connected by arms K, K, which are pivoted at their center to the bar I, as shown clearly in Fig. 3. By means of the arms K it will be seen that the two frames are made to move simultaneously in opposite directions and with equal velocity. The two frames are placed side by side and each frame has a vertical roller L fitted in each end.

To the end of the lower journals (a') of the outer roller of each frame F a pinion M is attached, and a screw (d) works in each pinion. These screws are placed on a shaft N placed transversely on the frame A as shown clearly in Fig. 2. The journals (a') pass entirely through the lower parts of the frames F, F, and the pinions M, M, are below the frames.

O, is a vertical roller which is placed in a frame P in the lower part of the frame A. The frame P is attached to a slide Q which may be secured at any desired point by a bolt (e). See Fig. 2. The roller O is placed underneath one of the outer rollers L, and the roller O is connected to said roller L by a rod (f), the upper end of which is fitted loosely in the pinion M of the roller L, and the lower end of the rod (f) is fitted loosely in the upper end of the roller O, the ends of the rod (f) having shoulders (g) upon it to serve as bearings, and also to form a connection so that the two rollers may move simultaneously, and at the same time the upper roller and frame allowed to have an independent lateral movement.

R is a frame which is placed by the side of the frame P. The frame R has a vertical roller S fitted within it, which roller is connected with the roller L above it by a rod (f') arranged precisely similar to the rod (f). The frame R has a spring T bearing against its outer side.

Stuff, such as plank A' requiring to be sawed or slit directly through the center so as to form boards, are placed between the frames F, F, and as these frames move simultaneously toward and from each other, with equal speed, it follows that the frames will always adjust the plank, or stuff so that its center will be fed toward the saw, and the stuff will consequently be sawed into two equal parts, the frames F being properly placed on the frame A, so that they will work toward and from a point in line with the saw B. The rollers L feed the stuff A' to the saw, the outer rollers L, being rotated by the screws (d). The outer rollers L communicate motion to the lower rollers O. S, by means of the rods (f) (f'), and the stuff B' which is placed between the frames P, R, may be sawed in boards of a greater or less thickness by adjusting the frame P, the required distance from the line of the saw. The stuff B' is kept snugly against the frame P, by the spring T, which bears against the outer side of the frame R. Motion is communicated to the shaft N, from the saw arbor C by a bolt c. Thus it will be seen that two different kinds of stuff may be sawed at the same time with the same machine. The invention is simple, may be constructed at a small cost, and there are no parts liable to get out of repair.

Having thus described my invention, what I claim as new and desire to secure by Letters Patent, is—

1. Connecting the slides G, H, of the two roller frames F, F, by arms K, K, as shown and described for the purpose specified.

2. I claim connecting the two upper and outer rollers L in the frames F, F, to the two lower rollers O, S, in the frames P, R, by means of the rods (f) (f') arranged as shown, so that a rotary motion is communicated to the lower rollers from the upper ones, and the upper rollers allowed to have an independent lateral movement as described.

SIMON P. WINNE.

Witnesses:
J. V. COLE,
CALVIN PEPPER.